United States Patent [19]

Fischer

[11] 4,429,489
[45] Feb. 7, 1984

[54] BOX-SHAPED CONTAINER FOR USE AS A COLD FRAME

[76] Inventor: Artur Fischer, Weinhalde 34, D-7244 Tumlingen 3, Fed. Rep. of Germany

[21] Appl. No.: 360,637

[22] Filed: Mar. 22, 1982

[30] Foreign Application Priority Data

Apr. 16, 1981 [DE] Fed. Rep. of Germany ....... 3115355

[51] Int. Cl.³ .............................................. A01G 9/06
[52] U.S. Cl. .......................................... 47/18; 47/17; 47/19
[58] Field of Search ................... 47/18, 19, 29, 26, 33; 403/231, 403; 220/420, 425, 430, 431, 445; 52/294, 275, 278, 279

[56] References Cited

U.S. PATENT DOCUMENTS

| | | | |
|---|---|---|---|
| 1,809,929 | 6/1931 | Farmer | 220/420 |
| 1,870,132 | 8/1932 | Miller | 403/231 |
| 2,339,220 | 1/1944 | Crowley | 52/278 |
| 2,545,717 | 12/1945 | Voigt | 47/18 |
| 3,321,864 | 5/1967 | Stasiuk | 47/19 |
| 3,889,419 | 6/1975 | Maleck | 49/382 |
| 3,912,407 | 10/1975 | Heininger | 403/231 |

*Primary Examiner*—Robert A. Hafer
*Assistant Examiner*—Bradley M. Lewis
*Attorney, Agent, or Firm*—Michael J. Striker

[57] ABSTRACT

A box-shaped container for use as a cold frame is composed of a number of side wall panels and a cover. The side wall panels and the cover are formed of hollow transparent panels of plastics. The side walls are connected to each other by connecting angle-shaped elements forming stop faces abutting against respective end surfaces of the adjacent walls to be connected. The connecting elements are formed with holes receiving stud pins extended through respective bores in side wall panels and locked thereon by locking members.

11 Claims, 2 Drawing Figures

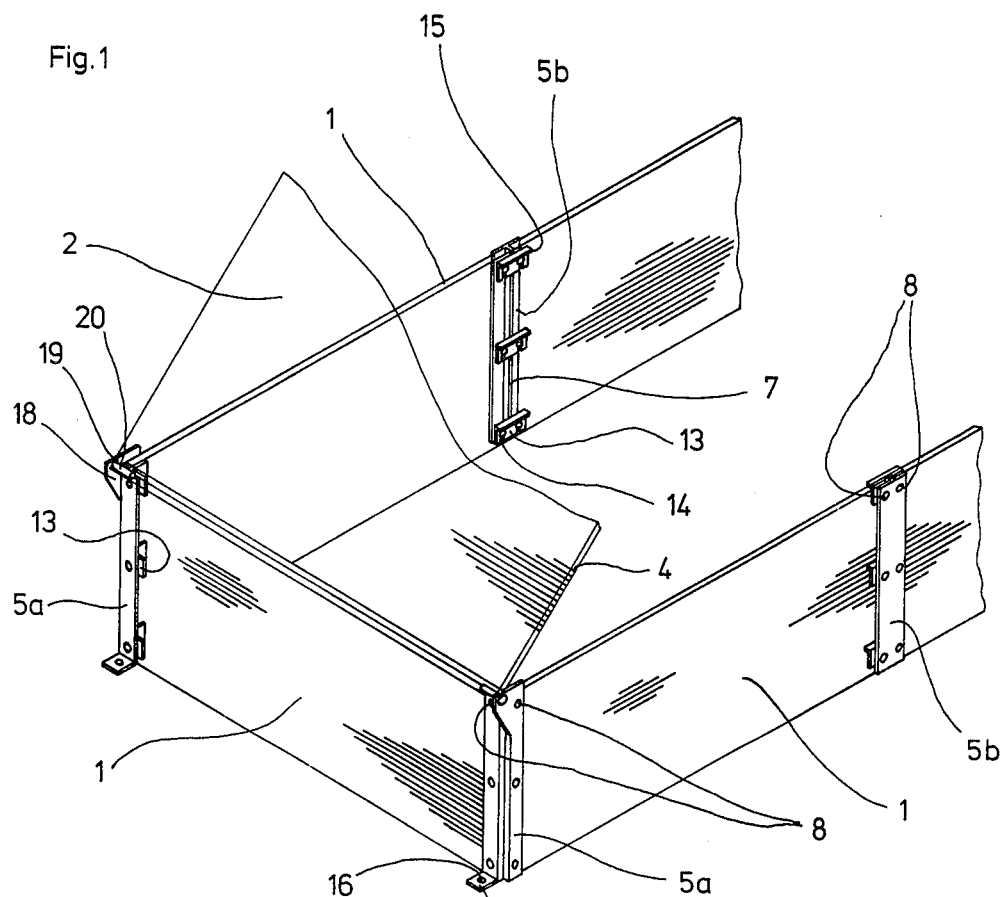
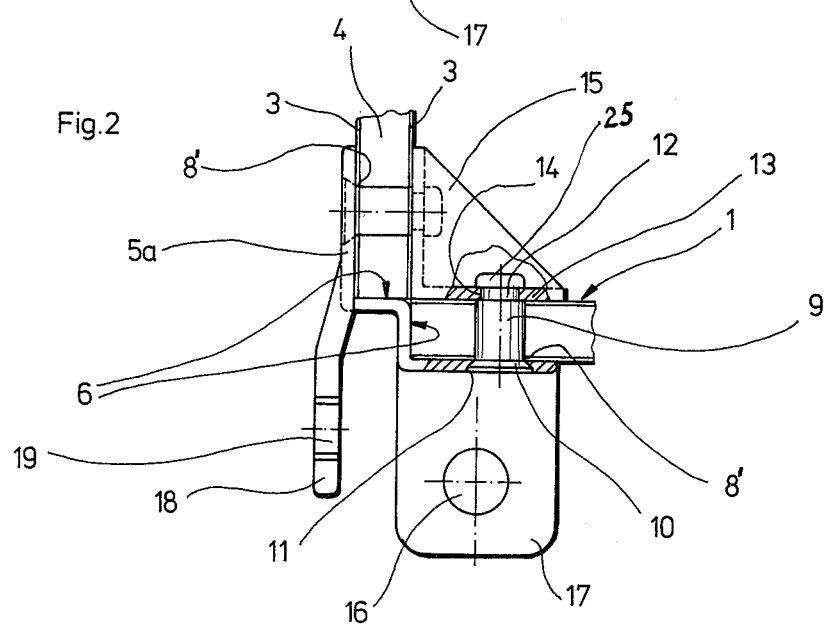

BOX-SHAPED CONTAINER FOR USE AS A COLD FRAME

BACKGROUND OF THE INVENTION

The invention relates to box-shaped containers in general, and particularly to those containers which are used as cold frames.

The containers normally include side wall panels, a cover and connecting elements for holding the side wall panels together.

There are known containers for use as cold frames, which containers consist of a pre-assembled frame of sheet metal, wood or similar material, and a transparent cover. Glass, sheet material or a corrugated sheet of transparent plastics may be used as a material for the cover.

The known cold frames, however have many disadvantages. For, example, the thermal insulation of the conventional cold frames is very low and the sensitivity to frost is therefore relatively high. Furthermore, insulation is possible only through the transparent cover, whilst the frame prevents lateral insulation. Finally, the transport and assembling conditions are deleteriously affected by the compact construction of the known cold frames.

SUMMARY OF THE INVENTION

It is an object of the invention to provide a container which can be fitted together to be used as a cold frame, which avoids the above mentioned drawbacks of conventional cold frames.

It is another object of the invention to provide an improved cold frame which is easy to assemble and efficient in use.

These and other objects of the invention are attained by a box-shaped container, particularly for use as a cold frame, comprising a plurality of side wall panels; a cover, said side wall panels and said cover being formed as hollow panels including face panels and cavity forming ribs extending between said face panels, said side wall panels being formed with bores; and connecting means to connect adjacent side wall panels to each other. The connecting means according to the invention each includes a connecting element having two stop faces abutting against respective ends of the side wall panels, said connecting element being formed with holes arranged in alignment with said bores, stud pins each having a circumferential groove and inserted into the respective hole, and extended into the respective bore, and a locking element having a slot and locked on the respective stud pin so that said slot engages the circumferential groove of the respective stud pin.

The side wall panels and cover panel are known per se hollow panels consisting of face panels and cavity-forming ribs.

As a result of using hollow panels as the side wall panels and as the cover, the box-shaped container is very light and can, therefore, be transported without great expenditure both in the unassembled and assembled form.

The hollow panels may be made of polycarbonate, polypropylene or similar plastics material and are transparent so that insulation is possible both through the side wall panels and through the cover. The hollow panels consist of two face panels which are connected to each other by longitudinally extending ribs. This produces cavities that have a high insulating effect. The cold frame is, therefore, insensitive to temporary drops in temperature, for example night frosts.

The assembly of the container is rendered possible by connecting elements which have stop faces that determine the angle between the ends of the side wall panels. These stop faces simultaneously seal the cavities of the hollow panels which end at the respective stop faces, so that no fine dust, rain water or the like can penetrate the cavities. The connecting elements are connected to the side wall panels by stud pins. For this purpose the connecting elements and the side wall panels are provided with bores that are aligned with one another. After inserting the stud pins, which each have a head and, at the opposite end, a circumferential groove, through these bores, locking parts are pushed over the stud pins in order to brace the connecting elements with the side wall panels, the slots of the locking parts engaging the circumferential grooves of the stud pins.

The connecting means include corner connecting means in which said faces define an angle between two adjacent side walls forming a corner of the container. The connecting means also include intermediate connecting means for connecting two adjacent side walls in lengthwise direction thereof, in which said connecting element has a substantially central portion extending between two adjacent side walls to be connected, said central portion forming said stop faces at outward surfaces thereof.

The locking element of the intermediate connecting means in formed with two slots parallel to each other and spaced from each other a predetermined distance, the ends of the side walls to be connected having the assigned bores spaced from each other a distance corresponding to said predetermined distance. As a result of this arrangement, it is possible to lock two stud pins with one locking part simultaneously. This allows an easier and more rapid assembly of the container.

In a further development of the invention the locking element may be provided with a projecting flange. The projecting flange acts as a handle so that, on the one hand the locking elements can be gripped more easily, and, on the other hand, the projecting flanges make more rigid.

The locking elements for the corner joints are constructed as angled pieces according to a further supplement to the invention.

The connecting element in the corner connecting means may include a bottom flange extended outwardly of the respective side wall and at right angles thereto, the bottom flange may be formed with an opening. Anchors, nails or similar means can be inserted into the opening of the bottom flange to anchor and improve the stability of the cold frame.

The cold frame may further include means for pivotable connection of said cover to one of said side wall panels, which means preferably include brackets mounted on two connecting elements of the corner connecting means mounted on two opposite ends of one wall panel, bearing bushes on said brackets, and link pins attached to the cover, said link pins being engaged in said bearing bushes to provide the pivotable connection of the cover relative to the frame of the container.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a partial perspective view of a container to be used as a cold frame, according to the invention; and FIG. 2 is a top plan view, partially in section of the corner joint of the container of FIG. 1.

DETAILED DESCRIPTION OF THE PREFERRED EMBODIMENTS

With reference to the drawings, the container is composed of side wall panels 1, and a cover 2. The hollow panels forming the side panels and the cover can be made out of polycarbonate, polyprophylene or similar plastics; the panels are transparent so that insulation is possible both through the side wall panels and through the cover.

Each hollow panel consists of two opposite face panels 3 which are connected to each other by longitudinal ribs 4. In order to assemble the container at least four corner connecting elements 5a are required. Since it is customary and convenient to use panels of the same size the length of the container or the cold frame may be extended by connecting two or more side panels in series using intermediate connecting elements 5b.

FIG. 2 shows in detail a corner joint of two adjacent side panels by connecting elements 5a. It is to be understood that some similar elements are utilized in the intermediate connecting elements 5b holding together two or more neighboring panels forming a single side wall of the container.

In case of the corner connecting elements 5a stop faces 6 thereof are arranged at right angles to each other, these stop faces abutting against two end faces of the respective side panels 1 forming a corner of the container. In case of the intermediate connecting elements 5b, these elements 5b each includes two opposite faces 6 which lie opposite each other and are formed by a central projection 7 which in assembly extends between and abuts against two end faces of the two adjacent side wall panels 1 forming the side wall of the container. The connecting elements 5a and 5b have, at least at their end regions two bores 8 spaced from each other. Three rows of bores 8 are shown for each connecting element in FIG. 1. Respective bores 8' aligning with bores 8 are made in each side wall panel to be joined. Locking elements or parts 13 are to be mounted on the inner sides of the side wall panels to be connected.

As seen in FIG. 2 stud pins 9 having heads 10 are inserted into bores 8, 8' until the respective head 10 of the stud pin rests against a bore counter-sink 11 made in the respective connecting element 5a or 5b. Each stud pin 9 is formed with a circumferential groove 12 and a projection 25 at the end thereof opposite to head 10. The end of stud pin 9 opposite to head 10 projects beyond the inner side of the hollow panel to such an extent that the inside edge of the circumferential groove which faces head 10 ends flush with the outer surface of the hollow panel 1. Each locking element 13 is formed with respective slots 14. The element 13 is pushed over the respective projections 25 of two adjacent stud pins 9 simultaneously so that slots 14 of the element 13 engage circumferential grooves 12 of the stud pins 9 whereby each stud pin 9 is locked in the bore of the side panel 1.

It is understood that in case of the corner joint slots 14 of the locking element 13 are positioned at right angles relative to one another whereas in case of joining two adjacent panels by connecting elements 5b slots 14 of elements 13 are offset from each other lengthwise. For the intermediate connecting elements 5b locking elements 13 are plate-shaped and for the corner connecting elements 5a they are designed as angled pieces.

In order to facilitate gripping of the locking elements 13 the latter are provided with flanges 15 which project at right angles from the portions thereof having slots 14 and act, on the one hand as a handle for the locking element 13, and, on the other hand, as means for increasing the rigidity of the locking element. The above described connection provides a strong joint between the connecting elements 5a, 5b and the side wall panels 1.

After the frame of the container has been assembled in the manner outlined above, the frame can be anchored down, in order to render it more stable, by driving anchors, nails or the like (not shown). Anchors or nails may be driven into openings 16 formed in bottom flanges 17 provided on some of the connecting elements 5a, 5b.

Corner connecting elements 5a are provided with an angled plate 18 carrying a bearing bush 19. Cover 2 in turn has attached thereto at opposite ends thereof link pins 20. Link pins 20 are pivotally engaged in opposite bearing bushes 19 so that cover 2 is pivotally connected to the frame of the container.

It will be understood that each of the elements described above, or two or more together, may also find a useful application in other types of cold frames differing from the types described above.

While the invention has been illustrated and described as embodied in a cold frame, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A box-shaped container for use as a cold frame, comprising a plurality of side wall panels; a cover, said side wall panels and said cover being formed as hollow transparent panels made of plastics and including face panels and cavity-forming ribs extending between said face panels, said side wall panels being formed with bores; and connecting means to connect adjacent side wall panels to each other, said connecting means each including a connecting element having two faces abutting against respective ends of the side wall panels, portions connected to and extending at right angles from said stop faces, said portions being formed with holes arranged in assembly in alignment with said bores, stud pins each having a circumferential groove and inserted into the respect hole and extended into the respective bore, and a locking element having a slot and locked on the respective stud so that pin said slot engages the circumferential groove of the respective stud pin.

2. The container of claim 1, wherein said connecting means include corner connecting means in which said faces define an angle between two adjacent side walls forming a corner of the container.

3. The container of claim 2, wherein said connecting means include intermediate connecting means for connecting two adjacent side walls in lengthwise direction thereof, in which said connecting element has a substantially central portion extending between the respective ends of two adjacent side walls to be connected, said central portion forming said stop faces at outward surfaces thereof.

4. The container of claim 3, wherein the locking element of the connecting means is formed with two said slots parallel to each other and spaced from each other a predetermined distance, the ends of the side walls to be connected having the assigned bores spaced from each other a distance corresponding to said predetermined distance.

5. The container of claim 4, wherein the locking element is provided with a projecting flange.

6. The container of claim 5, wherein the locking element in the corner connecting means is an angled piece.

7. The container of claim 6, wherein the connecting element in said corner connecting means includes a bottom flange extended outwardly of the respective side wall and at right angles thereto.

8. The container of claim 7, wherein said bottom flange is provided with an opening.

9. The container of claim 3 or 7, further including means for pivotable connection of said cover to one of said side wall panels.

10. The container of claim 9, wherein said means for pivotable connection include brackets mounted on two connecting elements of the corner connecting means mounted on two opposite ends of said one wall panel, bearing bushes on said brackets, and link pins attached to the cover, said link pins being engaged in said bearing bushes to provide said pivotable connection.

11. The container of claim 1, wherein said side hollow panels are made out of polycarbonate.

* * * * *